(12) United States Patent
Willimann et al.

(10) Patent No.: US 8,393,391 B2
(45) Date of Patent: Mar. 12, 2013

(54) DRY CEMENT FORMULATION FOR CEMENTING HOLES IN THE EARTH

(75) Inventors: Hongli Willimann, Baar (CH); Franck Vallee, Huningue (FR); Charles Zhang, Beijing (CN)

(73) Assignee: Akzo Nobel N.V., Arnhem (NL)

( * ) Notice: Subject to any disclaimer, the term of this patent is extended or adjusted under 35 U.S.C. 154(b) by 600 days.

(21) Appl. No.: 12/515,195

(22) PCT Filed: Nov. 15, 2007

(86) PCT No.: PCT/EP2007/062426
§ 371 (c)(1),
(2), (4) Date: Jan. 25, 2010

(87) PCT Pub. No.: WO2008/059037
PCT Pub. Date: May 22, 2008

(65) Prior Publication Data
US 2010/0139920 A1    Jun. 10, 2010

(30) Foreign Application Priority Data
Nov. 17, 2006  (EP) ................... 06023904

(51) Int. Cl.
*E21B 33/138*  (2006.01)
*C04B 11/30*  (2006.01)
*C04B 7/02*  (2006.01)

(52) U.S. Cl. ........ 166/293; 166/300; 106/640; 106/737; 106/816

(58) Field of Classification Search .......... None
See application file for complete search history.

(56) References Cited

U.S. PATENT DOCUMENTS

| | | | |
|---|---|---|---|
| 4,537,918 | A | 8/1985 | Parcevaux et al. |
| 6,391,952 | B1 | 5/2002 | Bett et al. |
| 6,559,236 | B1 | 5/2003 | Willimann et al. |
| 6,703,351 | B2 | 3/2004 | Stowe, II et al. |
| 2004/0110644 | A1 | 6/2004 | Halliday et al. |
| 2004/0132625 | A1 | 7/2004 | Halliday et al. |
| 2005/0092210 | A1 | 5/2005 | Radtke, Jr. |
| 2006/0211805 | A1 | 9/2006 | Willimann et al. |
| 2006/0270562 | A1 | 11/2006 | Xiang et al. |

FOREIGN PATENT DOCUMENTS

| | | |
|---|---|---|
| EP | 0 189 950 | 8/1986 |
| WO | WO 00/05275 | 2/2000 |
| WO | WO 00/05283 | 2/2000 |
| WO | WO 2004/078671 A1 | 9/2004 |
| WO | WO 2005/012456 | 2/2005 |
| WO | WO 2005/026288 | 3/2005 |
| WO | WO 2005/040253 | 5/2005 |
| WO | WO 2006/066725 | 6/2006 |
| WO | WO 2006/094528 | 9/2006 |

OTHER PUBLICATIONS

International Search Report and Written Opinion, International PCT Application No. PCT/EP2007/062426, mailed Dec. 28, 2007 (translated).
International Preliminary Report on Patentability, International PCT Application No. PCT/EP2007/062426, mailed Jun. 10, 2009 (translated).
European Search Report, European Application No. EP 06 02 3904 dated Apr. 19, 2007 (English-language translation provided).
T.G. Fox Bull. Am. Phy. Soc. (Ser II) 1, 123 (J5) (1956).
Ullmann's Enzyklopadie der Technischem Chemie, vol. 19, 4th edition, Verlag Chemie. Weinheim. 1980, pp. 17-20.
Ullmann's Encyclopedia of Industrial Chemistry, VCH, Weinheim, vol. A21 (1992), p. 169-170.
Abstract for API Specification for Materials and Testing for Wall Cements: API Spec. 10A, $22^{nd}$ Ed. Jan. 1995.
Abstract for API Specification for Materials and Testing for Wall Cements of the American Petroleum Institute, 10, $5^{th}$ Ed. Jul. 1, 1990.
English translation of Bazehnov et al., "Dry cement formulation technlogy," Moscow 2003 and Volzhenskiy et al., "Mineral Binders," Moscow 1979 (4 pages).
Translation Russian Office Action dated Aug. 3, 2009.

*Primary Examiner* — Zakiya W Bates
(74) *Attorney, Agent, or Firm* — Robert C. Morriss (57) ABSTRACT

The present invention pertains to a dry cement formulation for cementing earth boreholes, in particular oil, gas and/or terrestrial heat boreholes, containing a) about 20 to 99.9 wt. % cement, b) about 0 to 65 wt. % powdered quartz/or quartz dust, c) about 0.1 to 30 wt. % water-redispersible dispersion powder, and d) about 0 to 20 wt. % further additives. Furthermore, the invention pertains to the use of the dry cement formulation for preparing a cement slurry as well as to the use of water-redispersible dispersion powders in a cement slurry for cementing earth boreholes, wherein the cement slurries can be used for reducing the water loss of the cement slurry, for reducing the gas and/or water penetration and/or for sealing off the gas and/or water channels by means of the cement slurry which has been introduced into the borehole and has set.

20 Claims, 3 Drawing Sheets

Thickening Curves

90°C

130°C

DRY CEMENT FORMULATION FOR CEMENTING HOLES IN THE EARTH

The present invention pertains to dry cement formulations for cementing earth boreholes containing water-redispersible dispersion powders, as well as the use of the dry cement formulations. Furthermore, it pertains to specific uses of water-redispersible dispersion powders in a cement slurry in connection with the cementing of earth boreholes.

Earth boreholes are drilled in particular for oil and gas production. In recent times they are also increasingly applied for exploitation of terrestrial heat. The drilling depth can vary very widely and can be about 100 m to 5,000 m and more. The drilled through layers thus can be of the most varied nature and as a rule comprise everything from solid rock via softer, water-carrying layers to porous rock compounds. Moreover, such earth boreholes can also be drilled underneath sea water, as well as in arctic regions with permafrost. Furthermore, as a rule when drilling from 1,00 meters and more, elevated temperatures and pressures occur.

In particular in oil and gas production ordinarily a steel housing in the form of a tube is introduced into the drilled hole, which is fixed with a cement-based formulation which is placed between the rock layers and the introduced steel housing. In this connection among others the term "oil well cementing" is used. By this is meant a generic term comprising any type of cementing in connection with oil and gas wells and their production.

In any case, there is a large number of very different applications with different requirements in each case. The cementitious formulations used therefor thus can have totally different compositions in connection with the oil well cementing. These depend int. al. on the rock layer, as well as on the respective prevailing temperatures and pressures.

Thus for instance at the surface of the borehole as a rule a further, so-called surface casing is applied around the steel tube, which is likewise fixed with a cementitious compound. In the case of so-called "primary cementing" the inserted steel casing is fixed during or immediately after the drilling of the earth boreholes. The term "squeeze cementing" is used when existing earth boreholes are sealed off and by "plug-back cementing" is meant walling off and sealing off a borehole after conclusion of the oil production.

In order to meet the different requirements, the American Petroleum Institute (API) has specified nine different types of cement (API specification for Materials and Testing for Well Cements; API Spec. 10A, 22nd Edition, Jan. 1, 1995), which can be used at the different drilling depths depending on the occurring temperatures. In addition, there are further special cements, which are permitted depending on application and requirement range. These include pozzolanic cements, gypsum-containing cements, special cements for use in permafrost regions, reactive synthetic resin cements, diesel oil cements, expanding cements, light-weight cements, as well as calcium-aluminate cements. These last are used at temperatures to about 1,000° C. and more, which proves advantageous especially in the case of flaring off installations and blasts.

In order for the cementitious compounds to be able to satisfy the requirement profile in question, various formulation aids are added besides the respective types of cement, with often different classes of the respective additives having to be used for varying requirements. Thus for instance cellulose ethers only act as water retention agent ("fluid loss additive") below about 90 to 95° C. For that reason synthetically prepared water retention agents have to be used at higher temperatures, which prevail at greater drilling depths.

A further group of additives are aqueous polymer dispersions. Sometimes they are also used to improve the water retention in the not yet set cement slurry. Thus in WO 2006/066725 A1 a water retention agent is described which reduces the fluid loss in oil field fluids and cementitious sludges, consisting of a styrene-butadiene-latex and a high-molecular, water-soluble polymer. Dry cement formulations containing a polymeric binder are not mentioned.

Polymer dispersions are also used to reduce the water penetration through the set, cement-based formulation or to prevent it altogether. Furthermore, they are optionally used to prohibit the penetration of gases ("gas channeling & gas migration"). Thus for instance U.S. Pat. No. 4,537,918 and EP 189 950 A1 describe cement compositions for oil well cementing at elevated temperatures up to about 250° C. or more containing a styrene-butadiene-latex and a latex stabiliser, in order to prevent coagulation of the latex at elevated temperatures. By adding the latex stabiliser a right-angled setting behaviour ("right-angle-set") is achieved, which is extremely advantageous for this application. Dry cement formulations containing a polymeric binder are not mentioned.

In addition, polymer dispersions are also used to improve the flexibility and elasticity of the set cement formulation and/or to improve the adhesion to the steel housing, as well as to the rock of the borehole.

The use of polymer dispersions, which as a rule are present in aqueous form, in compounds containing hydraulically setting binders, such as for instance cement, has several drawbacks, however. Thus the polymer dispersions can only be mixed with the hydraulically setting binder in situ and at the time of the water addition, since otherwise the binder will set with the introduced water. This makes the dosing more complicated; after all, the three different components, hydraulically setting binder, aqueous polymer dispersion, and water together have to be dosed in such a way that not only the water/cement factor and hence the consistency of the mixed cementitious compound, but also the polymer/cement factor is set correctly. Otherwise, there is the risk of damage to the hardened matrix. In addition, aqueous polymer dispersions are also subject to certain restrictions with regard to shelf life. Thus the storage time is limited and in cold regions, such as for instance in regions with permafrost, the as a rule greatly restricted resistance to freeze-thaw of aqueous dispersions has to be taken into account, which leads to increased storage costs due to heated containers and/or heated storage warehouses. In addition, the water contained in the dispersion must always be transported as well, which is a major drawback in particular when the transport of the raw materials is expensive, for instance when raw materials have to be transported by helicopter to the place of use.

Water-redispersible polymer powders have gained wide acceptance in the dry mortar industry for the above-mentioned reasons, for instance in the case of ceramic tile adhesives, thermal insulation mortars, self-dispersing flooring compounds and repair compounds. In any case they are hardly mentioned in connection with cement formulations for earth boreholes and when they are, only in very general terms. The reason may lie in the completely different requirements and nature of the cement formulations. Since the latter often contain very high shares of cement, the skilled person expects that on mixing with water the greatly increased ionogenicity of the cement water can greatly restrict or even completely prevent the redispersibility. Moreover, in the case of the known dry mortar formulations the fillers contained therein, in particular powdered quartz, help with the redispersing of such powders through the shearing forces originating in the mixing process. Since work in oil well cementing is often also done at elevated temperatures, which can lead to the necessity of an additional stabilisation of aqueous polymer dispersions, the skilled person expects that as a rule water-redispersible polymer powders will not be suitable, or only very conditionally, for general use in oil well cementing, in particular since the used fluid polymer dispersions have been stabilised with the aid of emulsifiers, while in the preparation of water-redispersible dispersion powders high-molecular compounds, such as typically water-soluble protective colloids are used.

U.S. Pat. No. 6,391,952 B1 describes a water-redispersible powder, consisting of a water-insoluble film-forming polymer, which is prepared in the presence of at least one ethylenically unsaturated monomer and at least one special naphthaline sulfonate. The obtained powder can be used in joint sealers for the cementing of oil wells. In WO 200540253 A1 a method for the preparation of dispersions with a modified surface is described, wherein the dispersion with anionic groups is mixed with a two-block copolymer containing a neutral or anionic as well as a cationic group. This mixture can subsequently be atomised to a redispersible powder. Int. al. the use of this powder in mixed compounds for cementing oil boreholes is described in very general terms. Further details such as applicable temperature range, application area and/or composition of the compounds are not given. Nor is it mentioned whether the redispersible powder is redispersed with water in advance or is used in a dry cement formulation.

Hence the object is to avoid the drawbacks of the prior art, with in particular a formulation having to be made available by means of which polymer-modified formulations can be prepared without great expense and of which the water/cement factor and the polymer/cement factor can be advantageously set in a simple manner. In addition, it should also be possible to use these polymer-modified cement formulations at elevated temperatures.

Surprisingly, this object could be achieved by means of a dry cement formulation for cementing earth boreholes, in particular oil, gas and/or terrestrial heat boreholes, containing
  a) about 20 to 99.9 wt. % cement,
  b) about 0 to 65 wt. % powdered quartz and/or quartz dust,
  c) about 0.1 to 30 wt. % water-redispersible dispersion powder, and
  d) about 0 to 20 wt. % further additives.

In particular in the case of oil and gas boreholes it is helpful when the used types of cement satisfy the requirements of the American Petroleum Institute. Thus for these fields at least one cement should contain an API cement of classes A to J, which is selected depending on the specific requirements of the borehole, such as for instance based on the temperature and/or pressure prevailing at the respective depth of the borehole. Generally preferred API cement classes are the classes A, B, C, G, and H, with the classes G and H being especially preferred. Further details about the cement classes are to be found in API specification 10A, 22nd Edition of 1 Jan. 1995 of the American Petroleum Institute. In addition, also special cements, such as pozzolanic cements, gypsum cements, permafrost cements, resin and plastic cements, diesel oil cements, expanding cements, calcium-aluminate cements, and foamed cements can be used. Especially preferred as special cements are pozzolanic cements, permafrost cements, resin and plastic cements, as well as expanding cements.

As powdered quartz and/or quartz dust can be used amorphous, crystalline as well as partially crystalline quartzes, which optionally may also be modified. Quartzes which can be used according to the invention are powdered quartzes, quartz dusts, natural and/or synthetically prepared silicas, such as for instance precipitated silicas. Furthermore, according to the invention in al. also silicates, layered silicates, alumosilicates, silicon oxide, silicon dioxide, aluminium silicon oxide, aluminium silicate, magnesium silicate, aluminium silicate hydrate, calcium aluminium silicate, calcium silicate hydrate and/or aluminium iron magnesium silicate are covered thereby. In addition, also finer powdered quartz can be used. Generally, however, it is of great advantage as a rule when the sieve residue of the quartz in question after sieving through a 400 μm sieve, preferably through a 250 μm sieve, in particular through a 160 μm sieve, is at most about 5 wt. %.

Powdered quartzes and/or quartz dusts are used in particular when the earth borehole temperature is about 70° C. and higher, in particular about 100° C. and higher, wherein the higher the temperature, the greater the share of powdered quartz and/or quartz dust should be. For example, the content of powdered quartz and/or quartz dust at 100° C. can be approximately at 10 wt. % and at 130° C. approximately between 20 and 60 wt. %, preferably approximately between 30 and 50 wt. %. At this temperature the content of cement at 130° C. can be approximately between 20 and 80 wt. %, preferably between approximately 30 and 70 wt. %, in particular between approximately 40 and 70 wt. %, the content of water-redispersible dispersion powder at 130° C. can be between approximately 0.1 and 30 wt. %, preferably between approximately 1 and 20 wt. %, and the content of further additives can be between approximately 0 and 20 wt. %, preferably between approximately 1 and 15 wt. %.

If the temperature in the earth borehole is about 100° C. or lower, powdered quartz and/or quartz dusts may be left out altogether. A dry cement formulation for this temperature range preferably consists of about 50 to 99.9 wt. %, in particular of about 70 to 99 wt. % cement, about 0.1 to 30 wt. %, preferably about 0.5 to 20 wt. % water-redispersible dispersion powder, and about 0 to 20 wt. %, preferably about 0.5 to 10 wt. % of further additives.

The content of water-redispersible dispersion powder depending on the requirements made on the hardened cement formulation, such as for instance with respect to flexibility, bending strength and compression strength, adhesion and/or reduction of the gas and/or water penetration, is about 0.1 to 30 wt. %, preferably about 0.5 to 20 wt. %, in particular about 2 to 15 wt. %, based on the dry cement formulation.

The water-redispersible dispersion powder is prepared by drying of preferably aqueous dispersions. The drying preferably takes place by means of spray drying, freeze drying, fluidised bed drying, drum drying and/or flash drying, with spray drying being especially preferred.

Before the drying as a rule a share of water-soluble polymer is added to the dispersion to be dried, which can make the redispersion easier. The water-soluble polymer can have a non-ionic or an ionic character. It is often advantageous when the share of this water-soluble polymer is not too high. Preferred are contents of 10 wt. % or less, in particular of 5 wt. % or less, based on the solids content of the dispersion. It can also be omitted altogether.

The dispersion to be dried can be prepared by means of emulsion polymerisation, suspension polymerisation, microemulsion polymerisation and/or inverse emulsion polymerisation, wherein the polymerisate may optionally also have a heterogeneous morphology, which is obtained by the selection of the monomers and the preparative process. Also, different polymerisates can be compounded and dried together as a mixture.

Preferably, one or several high-molecular compounds serve as stabilising system of the thus prepared polymerisates. The application amount of these stabilising systems, calculated on the solids content of the dispersion, depending on the type of stabilising system is about 1 to 50 wt. %, in particular about 3 to 30 wt. %. In the case of water-soluble synthetic stabilising systems it is as a rule 1 to 20 wt. %, preferably about 3 to 15 wt. %, and in the case of water-insoluble stabilising systems it is about 5 to 50 wt. %, preferably about 10 to 40 wt. %, in particular about 15 to 30 wt. %.

Typical water-soluble organic polymer stabilising systems are preferably high-molecular compounds. These include natural compounds, such as polysaccharides, which optionally have been chemically modified, synthetic high-molecular oligomers, as well as polymerisates which have no or only a weak ionic character and/or polymerisates which are prepared with the aid of monomers which have an ionic character at least in part, for instance by means of radical polymerisation in an aqueous medium in situ. It is also possible that only one stabilising system is used or that several stabilising systems are combined with one another.

Preferred polysaccharides and their derivatives for use are cold water-soluble polysaccharides and polysaccharide ethers, such as cellulose ethers, starch ethers (amylose and/or amylopectin and/or their derivatives), guar ethers and/or dextrins. Use can also be made of synthetic polysaccharides, such as anionic, non-ionic or cationic heteropolysaccharides, in particular xanthan gum or wellan gum. The polysaccharides can be, but do not need to be, chemically modified, for instance with carboxymethyl, carboxyethyl, hydroxyethyl, hydroxypropyl, methyl, ethyl, propyl and/or long-chain alkyl groups. Further natural stabilising systems are alginates, peptides and/or proteins, such as for instance gelatin, casein and/or soy protein. Quite especially preferred are dextrins, starches, starch ethers, casein, soy protein, hydroxyalkyl cellulose and/or alkyl-hydroxyalkyl cellulose.

Synthetic stabilising systems are for instance one or several polyvinyl pyrrolidons and/or polyvinyl acetals with a molecular weight of 2,000 to 400,000, fully or partially saponified and/or modified fully or partially saponified polyvinyl alcohols with a degree of hydrolysis of preferably about 70 to 100 mol. %, in particular of about 80 to 98 mol. %, and a Höppler viscosity in 4% aqueous solution of preferably 1 to 50 mPas, in particular of about 3 to 40 mPas (measured at 20° C. in accordance with DIN 53015), as well as melamine formaldehyde sulfonate, naphthaline formaldehyde sulfonate, block copolymerisates of propylene oxide and ethylene oxide, styrene-maleic acid and/or vinyl ether-maleic acid copolymerisates. High-molecular oligomers can be non-ionic, anionic, cationic and/or amphoteric emulsifiers, such as for instance alkyl sulfonates, alkylaryl sulfonates, alkyl sulfates, sulfates of hydroxyl alkanols, alkyl and alkylaryl disulfonates, sulfonated fatty acids, sulfates and phosphates of polyethoxylated alkanols and alkyl phenols, as well as esters of sulfosuccinic acid, quarternary alkyl ammonium salts, quarternary alkyl phosphonium salts, polyaddition products, such as polyalkoxylates, for instance adducts of 5 to 50 moles of ethylene oxide and/or propylene oxide per mole of linear and/or branched $C_6$- to $C_{22}$-alkanols, alkyl phenols, higher fatty acids, higher fatty acid amines, primary and/or secondary higher alkylamines, with the alkyl group in each case preferably being a linear and/or branched $C_6$- to $C_{22}$-alkyl group.

Typical water-insoluble organic polymer stabilising systems are stabilising systems which are prepared with olefinically unsaturated monomers and which contain at least one ionic, unsaturated monomer. These stabilising systems can be cationic, anionic and/or amphoteric in nature. It is quite especially preferred when such systems are obtained in situ and/or are water-insoluble, in which case for instance (meth-)acrylic acid, monomers with sulfonic acid groups and/or cationic monomers can be used as monomers with an ionic group, as is described for example in EP 1 098 916 A1 and EP 1 109 838 A1.

Furthermore, also carboxyl groups-containing polymers based on mono- and/or dicarboxylic acids or their anhydrides, such as for instance polyacrylic acids, can be used as stabilising systems. In any case, care should be taken that the amount of such a stabilising system and/or the used amount of water-redispersible dispersion powder is not selected too high, in order not to have a too strong negative effect on the hydration of the mineral binder and the processing thereof.

It is preferred when in the preparation of the dispersions no emulsifiers are used, or they are used only in a share of less than about 3 wt. %, preferably of less than about 2 wt. %, in particular of less than about 1 wt. % emulsifiers, based on the monomer content of the water-redispersible dispersion powder.

The dispersions preferably used for the preparation of water-redispersible dispersion powders are based on one or several dispersions based on vinyl acetate, ethylene-vinyl acetate, ethylene-vinyl acetate-vinyl versatate, ethylene-vinyl acetate-vinyl chloride, ethylene-vinyl chloride, vinyl acetate-vinyl versatate, all (meth)acrylate, ethylene-vinyl acetate-(meth)acrylate, vinyl acetate-vinyl versatate-(meth)acrylate, vinyl acetate-maleic acid and vinyl acetate-maleic acid ester, vinyl acetate-vinyl versatate-maleic acid and vinyl acetate-vinyl versatate-maleic acid ester, vinyl acetate-(meth)acrylate-maleic acid and vinyl acetate-(meth)acrylate-maleic acid ester, styrene-acrylate and/or styrene-butadiene, with styrene-butadiene, styrene-acrylate, pure acrylate and/or vinyl versatate-acrylate copolymer dispersions being especially preferred, and with vinyl versatate being a $C_4$- to $C_{12}$-vinyl ester, and wherein the polymerisates can contain about 0-50 wt. %, in particular about 0-30 wt. %, and quite especially preferably about 0-10 wt. % of further monomers, in particular those with functional groups.

Suitable monomers and monomer classes for the preparation of these dispersions are for instance linear or branched $C_1$- to $C_{20}$-vinyl esters, ethylene, propylene, vinyl chloride, (meth)acrylic acids and their linear or branched $C_1$- to $C_{20}$-alkyl esters, (meth)acrylamide and (meth)acrylamide with N-substituted linear or branched $C_1$- to $C_{20}$-alkyl groups, acrylonitrile, styrene, styrene derivatives and/or dienes, such as for instance 1,3-butadiene. Preferred vinyl esters are linear or branched $C_1$- to $C_{12}$-vinyl esters, such as for instance vinyl acetate, vinyl stearate, vinyl formate, vinyl propionate, vinyl butyrate, vinyl pivalate, vinyl laurate, vinyl-2-ethylhexanoate, 1-methylvinyl acetate and/or $C_9$-, $C_{10}$- and/or $C_{11}$-vinyl versatate, vinyl pyrrolidone, N-vinyl formamide, N-vinyl acetamide, as well as vinyl esters of benzoic acids and p-tert-butyl benzoic acids, with vinyl acetate, vinyl laurate and/or vinyl versatate being particularly preferred. Preferred $C_1$- to $C_{12}$-alkyl groups of (meth)acrylic acid esters and N-substituted (meth)acrylamides are methyl, ethyl, propyl, n-butyl, i-butyl, t-butyl, hexyl, cyclohexyl, 2-ethylhexyl, lauryl, stearyl, norbornyl, polyalkylene oxide and/or polyalkylene glycol groups, in particular methyl, butyl, 2-ethylhexyl groups. Methyl methacrylate, n-butyl acrylate, t-butyl methacrylate, and 2-ethylhexyl methacrylate are particularly preferred. In addition, further monomers, in particular monomers with functional groups, can be introduced into a polymer. For example, maleic anhydride, unsaturated dicarboxylic acids and the branched or linear $C_1$- to $C_{20}$-esters thereof, in particular itaconic acid, maleic acid and/or fumaric acid and the esters thereof, ethylenically polyunsaturated comonomers, such as for instance divinyl adipate, diallyl maleate, allyl methacrylate or triallyl cyanurate, divinyl benzene, butane diol-1,4-dimethacrylate, triethylene glycol dimethacrylate, hexane diol-diacrylate, functional vinyl and/or (meth)acrylate monomers containing alkoxysilane, epihalohydrin, glycidyl, carboxyl, amine, hydroxyl, ammonium and/or sulfonic acid groups can be copolymerised. Preferred functional monomers are hydroxypropyl (meth)acrylate, N-methylol allyl carbamate, glycidyl (meth)-acrylate, methyl-acrylamidoglycolic acid methyl ester, N-methylol (meth)acrylamide, acrylamidoglycolic acid, 2-acrylamido-2-methyl-propane sulfonic acid, styrene sulfonic acid, (meth)acrylic acid-sulfoalkyl esters, itaconic acid-sulfoalkyl esters, preferably always as $C_1$- to $C_6$-alkyl esters, vinyl sulfonic acid and the alkali, alkaline earth and/or ammonium salts thereof, (meth)acryloxypropyl-tri(alkoxy)silane, vinyl trialkoxysilane, vinyl methyl dialkoxysilane, with the alkoxy groups used preferably being methoxy, ethoxy and/or isopropoxy groups, acetyl acetoxyethyl (meth)acrylate, diacetone acrylamide, acrylamidoglycolic acid, methyl-acrylamidoglycolic acid methyl ester, N-methylol (meth) acrylamide, N-methylolallyl carbamate, alkyl ether, esters of N-methylol (meth)acrylamide and N-methylolallyl carbamate, N-[3-(dimethylamino)-propyl]methacrylamide, N-[3-(dimethyl-amino)ethyl]methacrylate, N-[3-(trimethyl-ammonium)propyl]methacrylamide chloride and/or N,N-[3-chloro-2-hydroxypropyl)-3-dimethyl ammonium propyl] (meth)acrylamide chloride. The share of these comonomers, based on the overall monomer content, preferably is about 0 to 30 wt. %, in particular about 0 to 20 wt. %, and quite especially preferably about 0.1 to 10 wt. %, with care having to be taken that the share of free carboxyl groups preferably is not higher than about 10 wt. %, in particular not higher than about 5 wt. %, and quite especially preferably not higher than about 3 wt. %.

As a rule it is preferred when the water-redispersible dispersion powder is based on an aqueous, ionic groups-containing dispersion. This ionic group can be part of the stabilising system and/or stem from copolymerised ionic monomers. In a special embodiment the ionic groups originate from olefinically unsaturated monomers, with which the stabilising system is formed. It is also possible in that case that the ionic groups do not form until the alkaline pH range through deprotonation of corresponding acid groups.

These ionic groups-containing dispersions have a zeta potential in the electric field. It is not necessary for this to be highly pronounced. Hence a zeta potential of about −2.5 mV or less, in particular of about −5 mV or less, or of −5 mV or more, in particular of +10 mV or more, suffices.

The selection with regard to the necessary initiator systems for polymerisation is not subject to any restrictions. Thus all known initiator systems can be used, such as redox initiators, thermal initiators and/or catalytically active initiator systems.

For advantageous implementation of the invention it is of importance that the glass transition temperature $T_g$ of the emulsion polymerisate is within approximately −60° C. to 80° C., preferably approximately −30° C. to 60° C., quite especially preferably approximately −20° C. to 50° C., so that the polymerisate will have film-forming properties under the application conditions.

From the used monomers in each case the glass transition temperature $T_g$ of the prepared copolymerisates and thus of the emulsion polymerisates can be calculated empirically as well as determined experimentally. They can be calculated empirically with reference to the known Fox equation (T. G. Fox, *Bull. Am. Phy. Soc.* (serII) 1, 123 (1956) and Ullmann's *Encyclopedia of Technical Chemistry*, Vol. 19, 4th Ed., Verlag Chemie, Weinheim, 1980, pp. 17/18): $1/T_g = x_A/T_{gA} + x_B/T_{gB} + \ldots + x_n/T_{gn}$, wherein $x_A$, $x_B$ ... are the mass fractions of the used monomers A, B, ... (in wt. %) and $T_{gA}$, $T_{gB}$, ... are the glass transition temperatures $T_g$ in Kelvin of the respective homopolymerisates of A, B, .... These are for instance listed in *Ullmann's Encyclopedia of Industrial Chemistry*, VCH, Weinheim, Vol. A21 (1992), p. 169. Another possible way of determining the glass transition temperatures $T_g$ of the copolymerisates is the experimental determination, for instance by means of DSC, wherein the midpoint temperature should be taken into consideration (midpoint temperature according to ASTM D3418-82).

To the water-redispersible dispersion powders to be used according to the invention a film-forming adjuvant and/or a coalescing agent can be added, with the share preferably being about 0 to 5 wt. %, in particular about 0 to 2 wt. %, based on the copolymerisate content.

Very advantageous are water-redispersible dispersion powders with a low share of organic volatile components (VOC), with components having a boiling point of less than 250° C. at standard pressure being classified as such. These include for instance unreacted monomers and non-polymerisable contaminants—contained in the monomers and side-producers of the polymerisation. The VOC-content in the water-redispersible dispersion powder is less than about 5,000 ppm, preferably less than about 2,000 ppm, in particular less than about 1,000 ppm, and quite especially preferably less than about 500 ppm, based on the polymerisate content.

Also further components, such as additives, can be added to the water-redispersible dispersion powder, in which case the addition can take place before, during and/or after the drying. In principle, there are no limits on the nature of the components. Liquid components are preferably added before or during the drying, but they can also be sprayed onto the powder subsequently. Powdery components are preferably added during or after the spray drying, but they can also be added to the dispersion mixture before the drying step. Alternatively, additives which otherwise are added to the cement formulation separately, can be added directly to the water-redispersible dispersion powder, which in the application renders the mixing, but also the entire logistic course, such as for instance the storage, easier.

Surprisingly, it was found that the dry cement formulation according to the invention has an increased heat resistance. This is particularly the case when the water-redispersible dispersion powder is based on an aqueous, ionic groups-containing dispersion, in particular when the ionic groups originate from copolymerised ionic monomers. Thus these dry cement formulations, after they have been mixed with water, have a good processability even at temperatures of up to 90° C. and higher, preferably of up to 130° C. and higher.

In addition, the water loss, measured in accordance with API Specification 10, 5th Edition, Jul. 1, 1990 of the American Petroleum Institute (API Specification for Materials and Testing for Well Cements) at about +50° C. and higher, preferably about +70° C. and higher, in particular about +90° C.

and higher, expediently is less than about 100 ml/30 min, preferably less than about 75 ml/30 min, in particular less than about 50 ml/30 min.

Furthermore, the dry cement formulation mixed with water at a temperature of about +30° C. and higher, preferably of about +50° C. and higher, in particular of about +70° C., and quite especially preferably of about +90° C. and higher, has an essentially right-angle set. This is extremely desirable particularly when even at elevated temperatures over a particular time span, which can be set by means of setting accelerators or setting retarders, a low viscosity is required, so that the obtained cement slurry remains readily pumpable and processable. Once the setting process starts, however, the cement slurry hardens within a short time, for instance within a few minutes. To this end also see FIGS. 1 to 3.

Further additives can also be added to the dry cement formulation to set the properties profile required in each case. Preferred are dispersing agents, stabilisers, cement condensers, additives to control the cement hydration, in particular setting retarders, ionic and non-ionic water retention agents, such as synthetic polymers based on sulfate and/or sulfonate groups-containing monomers and/or polysaccharide ethers, such as cellulose or guar ethers, agents for reducing bleeding, in particular based on natural resins, defoamers, fibres, fly ash, fine carbonatic sands and/or powders, such as for instance limestone powder, carbonates and/or chalks, silicates and/or aluminium silicates. In addition, latent hydraulic binders, for instance pozzolanes, such as metakaolin, calcium metasilicate and/or volcanic slag, volcanic tuff, fly ash, blast furnace slag and/or silica dust can be used, which react hydraulically in combination with a calcium source, such as calcium hydroxide and/or cement.

Suitable as dispersing agents, stabilisers and/or cement condensers are formaldehyde condensation products, such as melamine, naphthaline, phenol- and/or acetone-formaldehyde condensates, which as a rule have been modified with sulfurous acid, sulfonic acid and/or sulfite salt. Furthermore, lignin sulfonates and the desulfurised derivates thereof, polycarboxylate ethers, such as e.g. maleic acid/acrylic acid copolymers with a mean molecular weight $M_w$ of about 4,000 to 200,000, maleic acid/vinyl ether copolymers with a mean molecular weight $M_w$ of about 4,000 to 200,000 and/or maleic acid/2-hydroxypropyl acrylate copolymers with a mean molecular weight $M_w$ of about 1,000 to 20,000, as well as polyacrylic acid and the copolymers thereof with a mean molecular weight $M_w$ of about 500 to 250,000 can be used.

The share of the further additives, based on the dry cement formulation, for instance for surface-active substances can be very small and be in the range of about 0.01 wt. % or more, in particular about 0.1 wt. % and more, but as a rule should not exceed about 5 wt. %, in particular about 3 wt. %. On the other hand, the share of water retention agents can be higher, but should not be more than about 15 wt. %, preferably not more than about 10 wt. %, and in particular not more than about 7 wt. %.

It is of great advantage when the dry cement formulation contains no essential share of greater solid particles. Thus as a rule it is preferred when the sieve residue of the dry cement formulation after sieving through a 400 μm sieve, preferably through a 250 μm sieve, in particular through a 160 μm sieve, is at most about 5 wt. %.

The dry cement formulation according to the invention is preferably used for preparing a cement slurry for cementing earth boreholes. This cement slurry is obtained by mixing the dry formulation with water and preferably is used during or immediately after the drilling of the earth boreholes and/or for sealing off existing earth boreholes. A further preferred use of the cement slurry prepared by mixing the dry formulation with water serves the reduction of the gas and/or water penetration and/or the sealing off of the gas and/or water channels by means of the cement slurry which has been introduced into the borehole and has set.

The water-redispersible dispersion powder used in the dry formulation in addition can also be first redispersed in water and be added as redispersion to a dry formulation which does not yet contain any or contains only a proportion of water-redispersible dispersion powder. In addition, it is also possible that optionally another cement formulation may be used. Also in a cement slurry obtained in this way the water-redispersible dispersion powder can be used for reducing the gas and/or water penetration and/or for sealing off the gas and/or water channels by means of the cement slurry which has been introduced into earth boreholes, in particular in oil, gas and/or terrestrial heat boreholes, and has set.

In particular when the water-redispersible dispersion powder is based on an aqueous, ionic groups-containing dispersion, with the ionic groups originating in particular from copolymerised ionic monomers, the water-redispersible dispersion powder in a cement slurry is suitable for cementing earth boreholes, in particular oil, gas and/or terrestrial heat boreholes, at earth borehole temperatures of about +30° C. or higher, preferably of +50° C. and higher, in particular of +70° C. and higher, and quite especially preferably of +90° C. and higher. A further preferred use of the water-redispersible dispersion powder in a cement slurry serves the reduction of the water loss of the cement slurry, with the water loss in accordance with API Specification 10 at about +50° C. and higher, preferably about +70° C. and higher, in particular about +90° C. and higher, being less than about 100 ml/30 min, preferably less than about 75 ml/30 min, in particular less than about 50 ml/30 min.

The present invention offers many advantages. As a result of the use of water-redispersible dispersion powders, water does not have to be transported to the job site, as is the case when using aqueous dispersions or latices. This plays an important part in particular in the case of application at natural gas and oil platforms, where as a rule the raw materials are flown in by helicopter. In addition, with water-redispersible dispersion powders the resistance to freeze-thaw is guaranteed, as is a longer shelf life of the dispersion powder without biocides. Furthermore, the mixing process is greatly simplified by only the polymer-modified dry cement formulations having to be mixed with water, with it also being possible to first redisperse the dispersion powder in water and to mix it with the cement formulation as redispersion. As water source fresh water, salt water or another water source can be used.

The invention is further elucidated with reference to the following Examples.

The following formulations were prepared:

Formulation 1:

| | |
|---|---|
| 97.2 wt. % | API cement of class G |
| 2.2 wt. % | water-redispersible dispersion powder |
| 0.15 wt. % | hydroxyethyl cellulose H100000YP2 |
| 0.5 wt. % | sulfonated polycondensation product based on melamine |

The water-cement factor was set to a value of w/c=0.44.
Formulation 2:

| | |
|---|---|
| 93.4 wt. % | API cement of class G |
| 2.2 wt. % | water-redispersible dispersion powder |
| 0.4 wt. % | acetone-formaldehyde-sulfite condensate |
| 4.0 wt. % | water retention agent ("fluid loss control agent") based on a sulfonic acid polymerisate |

The water-cement factor (w/c) was set to a value of 0.44. The result was a readily processable cement slurry with a density of 1.9 g/cm$^3$.
Formulation 3:

| | |
|---|---|
| 92.7 wt. % | API cement of class G |
| 2.2 wt. % | water-redispersible dispersion powder |
| 0.4 wt. % | acetone-formaldehyde-sulfite condensate |
| 4.0 wt. % | water retention agent ("fluid loss control agent") based on a sulfonic acid polymerisate |
| 0.06 wt. % | commercially available setting retarder |
| 0.6 wt. % | commercially available defoamer |

The water-cement factor (w/c) was set to a value of 0.44. The result was a readily processable cement slurry with a density of 1.9 g/cm$^3$.
Formulation 4:

| | |
|---|---|
| 59.4 wt. % | API cement of class G |
| 33.3 wt. % | powdered quartz |
| 2.2 wt. % | water-redispersible dispersion powder, |
| 0.4 wt. % | acetone-formaldehyde-sulfite condensate |
| 4.0 wt. % | water retention agent ("fluid loss control agent") based on a sulfonic acid polymerisate |
| 0.06 wt. % | commercially available setting retarder |
| 0.6 wt. % | commercially available defoamer |

The water-cement factor (w/c) was set to a value of 0.55. The result was a readily processable cement slurry with a density of 1.9 g/cm$^3$.
Used Dispersion Powders:
Ref-1: Commercially used reference latex based on styrene-butadiene.
Ref-2: No latex was used.
EVA-1: Water-redispersible dispersion powder based on a polyvinyl alcohol-stabilised aqueous ethylene-vinyl acetate dispersion.
St/Ac-1: Water-redispersible dispersion powder based on a polyvinyl alcohol-stabilised aqueous styrene-acrylate dispersion.
St/Ac-2: Water-redispersible dispersion powder based on an aqueous, emulsifier-free styrene-acrylate dispersion, which was stabilised with the aid of a cationic groups-containing, water-insoluble (meth)acrylate-based copolymerisate. The share of tertiary ammonium groups-containing monomer is 4.1 wt. %, based on the entire amount of monomer.
St/Ac-3: Water-redispersible dispersion powder based on an aqueous, emulsifier-free styrene-acrylate dispersion, which was stabilised with the aid of a sulfonate groups-containing, water-insoluble (meth)acrylate-based copolymerisate. The share of sulfonate groups-containing monomer is 5.4 wt. %, based on the entire amount of monomer.
St/Ac-4: Water-redispersible dispersion powder based on an aqueous, emulsifier-free styrene-acrylate dispersion, which was stabilised with the aid of a sulfonate groups-containing, water-insoluble (meth)acrylate-based copolymerisate. The share of sulfonate groups-containing monomer is 2.8 wt. %, based on the entire amount of monomer.

EXAMPLE 1

500 g of formulation 1 were mixed with water with a 60 mm propeller stirrer at a rate of 950 rpm for 60 seconds, with the corresponding amount of tempering water being added with stirring. After a maturing time of 3 minutes the mortar was again stirred quickly by hand, with the setting behaviour subsequently being measured at 23° C. and 50% relative humidity with a Vicat set needle unit in accordance with DIN 1164.

Figure 1:
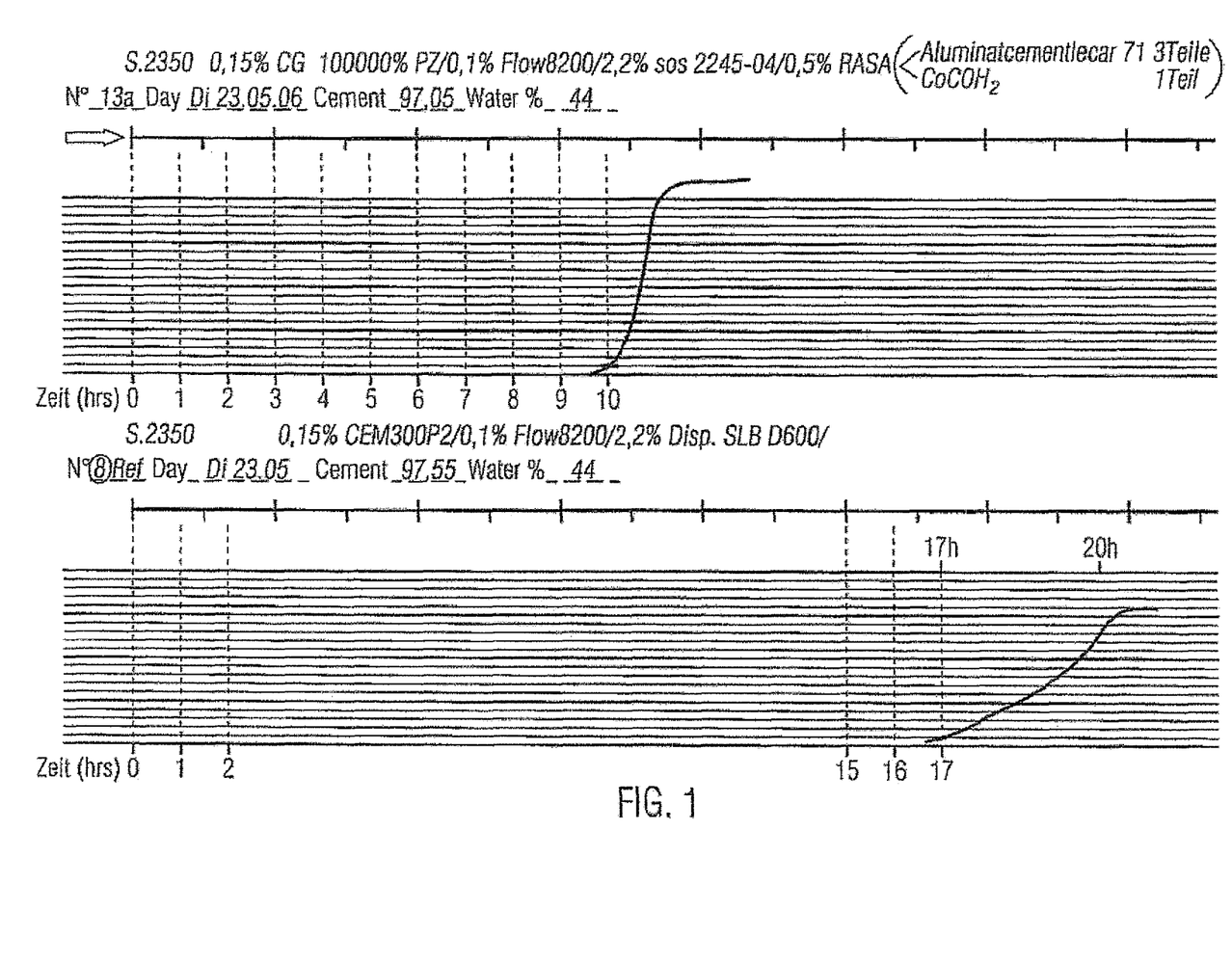
FIG. 1 is a graphical comparison of setting curves for mortar containing dispersion powders in accordance with Example 1.

In FIG. 1 (FIG. 1) the setting curves are represented, wherein the upper curve was obtained with the water-redispersible dispersion powder St/Ac-4. The setting started after about 10 hours and the setting ended after about 11¼ hours. The lower curve was measured with a commercially available styrene-butadiene dispersion used for cementing earth boreholes. The setting started after about 17 hours and the setting ended after about 20 hours. For comparison in addition a water-redispersible dispersion powder St/Ac-1 was measured where the start of setting was after about 13 hours and the end of setting was after about 14½ hours.

Figure 2:
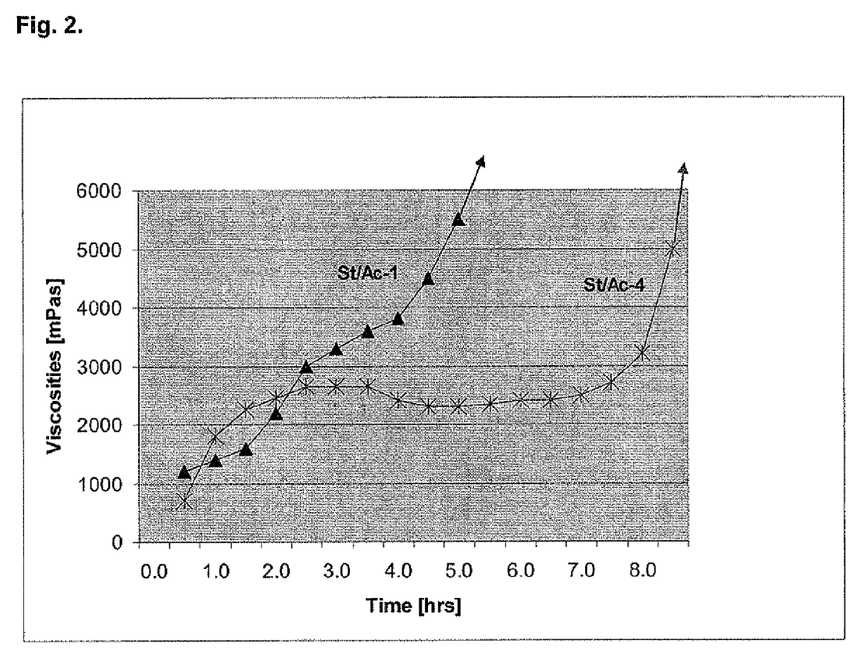
FIG. 2 is graph showing viscosity change over time for the mortars according to Example 1.

The same formulation was mixed anew, in which process after the maturing time and the further mixing of the mortar each of 20 different glass containers was subsequently charged with in each case 20 ml of the obtained cement slurry. The glass containers were sealed and 15 minutes after the start of the mixing process placed in a water bath of 90° C. After every half hour a glass container was removed from the water bath and without any further mixing immediately the Brookfield viscosity was measured. Measuring values above 6,000 mPas could not be measured, as the mortar was too high-viscous (St/Ac-1), or already hard (St/Ac-4). The Brookfield viscosities were measured following ASTM D1084 with spindle 5 at 100 rpm and are represented in FIG. 2 (FIG. 2).

Both tests clearly show that the water-redispersible dispersion powder St/Ac-1 at 90° C. in the cement slurry based on formulation 1 does not accelerate the setting process more or less, but gels, which leads to the continually higher viscosity. In order for St/Ac-1 to be used also at higher temperatures, additional stabilising agents have to be added to obtain the desired right-angle set. St/Ac-4, on the other hand, shows the right-angle set important for higher use temperatures also without additional stabilising agents, in which case the rise in viscosity at the start of the measuring can be traced back to the not quite ideal test conditions, such as for instance no continuous thorough mixing of the sample. Also worth commenting upon is the short time in comparison with St/Ac-1 between the start and the end of the mortar setting, measured with the Vicat set needle unit at room temperature.

EXAMPLE 2

Formulation 2 was mixed in accordance with API Standard RP 10 B, section 5 of the American Petroleum Institute at room temperature at a high rate of shear with a "Waring Blendor" mixer and subsequently stirred at 93° C. in a so-called "atmospheric consistometer", Type Chandler, in accordance with API Standard RP 10 B, section 9. All samples listed in Table 1 showed a good stability of the obtained cement slurry, with no free water being observed.

The rheological parameters were determined with the aid of a FANN 35 V-G viscometer at the measuring temperature, in accordance with API Standard RP 10 B, Appendix H.

The values of Table 1 clearly show that the water-redispersible dispersion powders based on polyvinyl alcohol-stabilised aqueous dispersions, such as EVA-1 and St/Ac-1, are less suitable for use at higher temperatures without additional stabilising agents. On the other hand, the water-redispersible dispersion powders St/Ac-2, St/Ac-3, and St/Ac-4 can be used without further additives. They do not lead to any undesired effects, as the values in comparison with reference Ref-1, containing a commercially used latex, and reference Ref-2, containing neither a latex nor a dispersion powder, show.

TABLE 1

Rheological properties in accordance with API Standard RP 10 B, measured at 93° C., of different water-redispersible dispersion powders in a cement slurry based on Formulation 2.

| Powder No. | Flowing degree[a] [cm] | API water loss[b] [ml] | Flow index[c] | Thickening time[d] [min] | Compression strength[e] [MPa] |
|---|---|---|---|---|---|
| Requirement[f] | 26 +/− 2 | <50 | >0.75 | 135 +/− 30 | >14 |
| Ref-1 | 28 | 24 | 0.920 | 154 | 19.7 |
| Ref-2 | 26 | 28 | 0.901 | 135 | 24.3 |
| EVA-1 | 26 | 88 | n.m.[g] | 145 | n.m.[g] |
| St/Ac-1 | 25 | 80 | n.m.[g] | 213 | n.m.[g] |
| St/Ac-2 | 24 | 32 | 0.885 | n.m.[g] | n.m.[g] |
| St/Ac-3 | 24 | 22 | 0.877 | 124 | 20.3 |
| St/Ac-4 | 25 | 26 | 0.821 | 164 | 19.2 |

[a]The flowing degree is indicated in centimeters.
[b]The water loss in accordance with API ("API water loss") is based on the first 30 minutes and is indicated in milliliters of water.
[c]The flow index was determined at 93° C.
[d]As thickening time the time in minutes is indicated until the dimensionless "Bearden Consistency" of 70 is attained at the measuring temperature.
[e]The compression strengths, indicated in MPa, were measured after a storage time of 24 hours.
[f]Requirement specifies the target value to be attained.
[g]n.m. stands for not measured.

EXAMPLE 3

Figure 3:
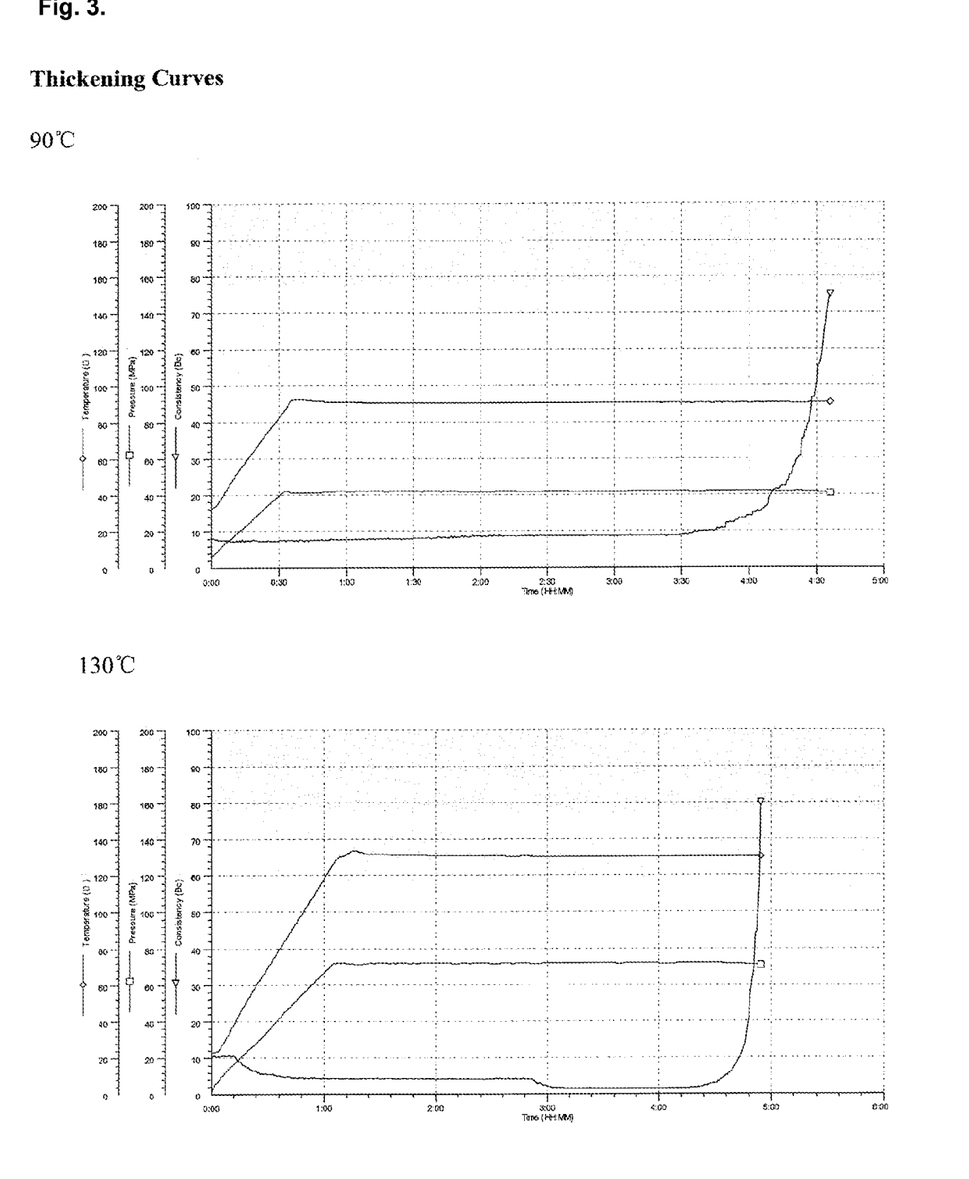
FIG. 3 is a graphical comparison of thickening curves at different temperatures for mortar according to Example 3.

Example 2 was repeated, with only the water-redispersible dispersion powder St/Ac-4 being used. In addition, the cement slurry based on Formulation 3 was tested at 90° C. and the cement slurry based on Formulation 4 was tested at 130° C. Both mixtures showed a good stability without free water. In addition, the cement slurry in each case was measured as a function of time. The obtained values are represented in FIG. 3 (FIG. 3) and show the right-angle set of the cement slurry which was obtained by mixing of the dry cement formulation according to the invention with water.

TABLE 2

Rheological properties in accordance with API Standard RP 10 B, measured at 90° C. and 130° C., of the water-redispersible dispersion powder St/Ac-4 in a cement slurry based on Formulation 3 (measured value 90° C.), or based on Formulation 4 (measured value at 130° C.).

| Temperature | Flowing degree[a] [cm] | API water loss[b] [ml] | Flow index[c] | Thickening time[d] [min] | Compression strength[e] [MPa] |
|---|---|---|---|---|---|
| Requirement[f] | 26 +/− 2 | <50 | >0.75 | N/A[g] | >14 |
| 90° C. | 25 | 24 | 0.885 | 276 | 18.6 |
| 130° C. | 24 | 46 | 0.823 | 294 | 19.5 |

[a]cf. Table 1
[b]cf. Table 1
[c]cf. Table 1
[d]cf. Table 1, FIG. 1, and the explanations to this end in the text.
[e]cf. Table 1
[f]cf. Table 1
[g]The thickening time can be set with the aid of a setting retarder. Hence there is no nominal value.

When the share of monomers with ionic groups is increased in the preparation of the dispersion, the stability of the dispersion powder prepared therefrom can also be guaranteed at higher temperatures still. In addition, the dispersing agent used may optionally be reduced or even omitted altogether.

The Examples show that the water-redispersible dispersion powders surprisingly also redisperse well when dry cement formulations according to the invention are mixed with water. The high ionogenicity and strongly alkaline pH-value brought about by the high cement content do not lead to any coagulates or other negative interactions. In particular, in the case of such extreme conditions fillers such as powdered quartzes, which in the mixing process support the redispersion through the high shear forces being formed, are not necessary either.

The thus obtained and set cement slurries can seal off newly drilled as well as existing earth boreholes from penetrating water or natural gas also at increased pressure. This greatly reduces the risk of a sudden strong release of natural gas.

The invention claimed is:

1. A dry cement formulation for cementing earth boreholes consisting of:
   a) 20 to 99.9 weight % of cement,
   b) 0 to 65 weight % of at least one of powdered quartz and quartz dust having a sieve residue through a 250 μm sieve of at most 5 wt. %,
   c) 0.1 to 30 weight % of a water-redispersible dispersion powder, and
   d) 0 to 20 weight % of further additives.

2. The dry cement formulation according to claim 1, wherein the cement contains at least one API cement of the classes A to J according to API Specification 10A, 22$^{nd}$ Edition, Jan. 1, 1995.

3. The dry cement formulation according to claim 1, wherein the water-redispersible dispersion powder traces back to an aqueous, ionic groups-containing dispersion, wherein the ionic groups originate from copolymerized ionic monomers.

4. The dry cement formulation according to claim 1, wherein the water-redispersible dispersion powder traces back to at least one of dried styrene-butadiene, styrene-acrylic, all-acrylic and vinyl versatate-acrylic copolymer dispersions.

5. The dry cement formulation according to claim 1, wherein the water-redispersible dispersion powder contains less than about 3 weight % of emulsifiers, based on a monomer share of the water-redispersible dispersion powder.

6. The dry cement formulation according to claim 1, wherein in accordance with API Specification 10, 5$^{th}$ Edition, Jul. 1, 1990, at about +50° C. and higher, a water loss of the dry cement formulation mixed with water is less than about 100 ml/30 min.

7. The dry cement formulation according to claim 1, wherein at a temperature of about +30° C. and higher, the dry cement formulation mixed with water shows an essentially right-angled setting behavior.

8. The dry cement formulation according to claim 1, wherein the further additives are at least one of dispersing agents, stabilizers, cement superplasticizers, additives to control cement hydration, setting retarders, water retention agents, defoamers, fibers, fly ash, silicates and aluminum silicates.

9. The dry cement formulation according to claim 1, wherein a sieve residue of the dry cement formulation after sieving through a 400 μm sieve is at most about 5 weight %.

10. A method of preparing a cement slurry for cementing earth boreholes, the method comprising:
mixing the dry cement formulation according to claim 1 with water.

11. A cement slurry comprising:
the dry cement formulation according to claim 1; and water.

12. A method of cementing earth boreholes, the method comprising:
introducing the cement slurry according to claim 11 into an earth borehole during or directly after the drilling of the earth borehole, or introducing the cement slurry into an existing earth borehole.

13. The method according to claim 12, wherein the earth borehole is at least one of an oil borehole, a gas borehole and a terrestrial heat borehole, and wherein the earth borehole temperature is about +30° C. or higher.

14. A method of reducing the gas and/or water penetration into an earth borehole, and/or of sealing off the gas and/or water channels in the earth borehole, the method comprising:
introducing the cement slurry according to claim 11 into the earth borehole; and
allowing the cement slurry to set.

15. The method according to claim 14, wherein the earth borehole is at least one of an oil borehole, a gas borehole and a terrestrial heat borehole.

16. The cement slurry according to claim 11, wherein a water loss of the cement slurry, in accordance with API Specification RP 10 B, 22$^{th}$ Edition, 1997, at about +50° C. and higher, is less than about 100 ml/30 min.

17. The dry cement formulation according to claim 1, wherein the water-redispersible dispersion powder contains less than about 2 weight % of emulsifiers, based on a monomer share of the water-redispersible dispersion powder.

18. The dry cement formulation according to claim 1, wherein in accordance with API Specification 10, 5$^{th}$ Edition, Jul. 1, 1990, at about +70° C. and higher, a water loss of the dry cement formulation mixed with water is less than about 75 ml/30 min.

19. The dry cement formulation according to claim 1, wherein at a temperature of about +50° C. and higher, the dry cement formulation mixed with water shows an essentially right-angled setting behavior.

20. The dry cement formulation according to claim 1, wherein a sieve residue of the dry cement formulation after sieving through a 250 μm sieve is at most about 5 weight %.

* * * * *